United States Patent
Aslan et al.

(10) Patent No.: US 7,766,546 B1
(45) Date of Patent: Aug. 3, 2010

(54) BETA VARIATION CANCELLATION IN TEMPERATURE SENSORS

(75) Inventors: Mehmet Aslan, Sunnyvale, CA (US); John W. Branch, Seattle, WA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 12/284,501

(22) Filed: Sep. 23, 2008

Related U.S. Application Data (63) Continuation of application No. 10/865,609, filed on Jun. 9, 2004, now abandoned.

(51) Int. Cl.
*G01K 7/00* (2006.01)
*H01L 31/00* (2006.01)

(52) U.S. Cl. ........................ 374/178; 327/512

(58) Field of Classification Search ............... 374/178; 327/512
See application file for complete search history.

(56) References Cited

U.S. PATENT DOCUMENTS

| | | | | |
|---|---|---|---|---|
| 5,195,827 A | * | 3/1993 | Audy et al. | 374/172 |
| 7,010,440 B1 | * | 3/2006 | Lillis et al. | 702/65 |
| 7,170,334 B2 | * | 1/2007 | Miranda et al. | 327/512 |
| 7,333,038 B1 | * | 2/2008 | Aslan | 341/120 |
| 2006/0222049 A1 | * | 10/2006 | Cave | 374/178 |
| 2007/0001744 A1 | * | 1/2007 | Miranda et al. | 327/512 |
| 2007/0115042 A1 | * | 5/2007 | McLeod et al. | 327/512 |
| 2008/0165826 A1 | * | 7/2008 | Cheng et al. | 374/178 |

* cited by examiner

*Primary Examiner*—Gail Verbitsky
*Assistant Examiner*—Mirellys Jagan
(74) *Attorney, Agent, or Firm*—Girard & Equitz LLP (57) ABSTRACT

An apparatus and method for canceling variations in the beta for a bipolar junction transistor so that the diode equation can be employed to accurately measure the temperature of the transistor based at least in part on a ratio of two target collector currents and two measurements of the base-emitter voltage of the transistor. If the determined collector current of the transistor is relatively equivalent to one of the first and second target collector currents, the transistor's base-emitter voltage is measured and stored. An analog feedback circuit can be employed to change the determined collector current to be relatively equivalent to the first and second target collector currents. The analog feedback circuit can include an optional sample and hold component to further reduce power consumption and reduce noise. A digital circuit can be employed to change the determined collector current to be relatively equivalent to the first and second target collector currents. Additionally, the transistor can be remotely located in another integrated circuit.

20 Claims, 12 Drawing Sheets

Figure 1

PRIOR ART

BETA VARIATION CANCELLATION IN TEMPERATURE SENSORS

CROSS-REFERENCE TO RELATED APPLICATIONS

This utility patent application is a continuation of U.S. patent application Ser. No. 10/865,609, filed Jun. 9, 2004, now abandoned the benefit of which is hereby claimed under 35U.S.C. Section 120 and the contents of which are fully incorporated herein by reference.

FIELD OF THE INVENTION

The invention is generally directed to the measuring the temperature of an electronic device, and more particularly, to improving the accuracy of measuring a temperature signal provided by a transistor disposed in an electronic device.

BACKGROUND OF THE INVENTION

An electronic temperature sensor circuit can be arranged to measure the temperature on a remote (separate) silicon chip by providing one or more known currents to a p-n junction located on the remote chip. This circuit measures a diode voltage of this p-n junction and processes the diode voltage to determine the actual temperature at the remote location. Most p-n junctions employed for this purpose are parasitic vertical p-n-p silicon based transistors. Also, the temperature sensor circuit is usually arranged to control the emitter currents of the transistor.

The classic diode equation is often employed to determine the actual temperature at the remotely located p-n-p transistor based on a ratio of approximated collector currents. So long as the emitter current and collector current are substantially equivalent for this remotely located transistor, the determined temperature can be relatively accurate. However, if the beta (ratio of collector current over base current) of the p-n-p transistor varies with a varying emitter current, a determined temperature based on the diode equation can be less accurate. Recently, process variations and the ever shrinking physical size of process geometries for silicon devices are causing the beta to vary significantly with a varying emitter current.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION OF THE INVENTION

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Briefly stated, the present invention is directed to an apparatus and method for canceling variations in the beta for a transistor so that the diode equation can be employed to accurately measure the temperature of the transistor based at least in part on a ratio of two target collector currents (Ictarget1, Ictarget2) and two measurements of the base-emitter voltage (Vbe1, Vbe2) of the transistor. If the determined collector current of the transistor is relatively equivalent to one of the first and second target collector currents, the transistor's base-emitter voltage is measured and stored. An analog feedback circuit can be employed to change the determined collector current to be relatively equivalent to the first and second target collector currents. The analog feedback circuit can include an optional sample and hold component to further reduce power consumption and reduce noise. A digital circuit can be employed to change the determined collector current to be relatively equivalent to the first and second target collector currents. Additionally, the transistor whose currents are measured/determined to determine its temperature can be remotely located in another integrated circuit (chip) or disposed in the same integrated circuit as the invention.

The classic diode equation determines a change in the base emitter voltage (ΔVbe) for a p-n-p transistor as follows:

$$\Delta Vbe = \eta \frac{\kappa T}{q} \ln\left(\frac{Ic1}{Ic2}\right) \qquad \text{Equation 1}$$

where η is a non-ideality constant substantially equivalent to 1.00 or slightly more/less, κ is the well known boltzmann's constant, q is the electron charge, T is the temperature in Kelvin, Ic1 is a first collector current, and Ic2 is a second collector current that are present at the measurement of a first base-emitter voltage and a second base-emitter voltage.

In the past, since a ratio of collector currents tended to be relatively equivalent to a ratio of known emitter currents (Ie), the diode equation could be accurately approximated in a rewritten form that follows:

$$T = \Delta Vbe \Big/ \left(\eta \frac{\kappa}{q} \ln\left(\frac{Ie1}{Ie2}\right)\right) \text{ where } \frac{Ic1}{Ic2} = \frac{Ie1}{Ie2}; \qquad \text{Equation 2}$$

However, due in part to process variations for integrated circuits with smaller process geometries, the assumption regarding relatively equivalent ratios may no longer be valid. The beta (ratio of collector current over base current) has been shown to vary as much as 10 percent or more between two known emitter currents for p-n-p transistors in integrated circuits manufactured from relatively smaller process geometries.

In an exemplary integrated circuit based on a smaller die size, a beta of 0.77 was measured for a 10 microamp emitter current provided to a transistor. For the same transistor, the measured beta was 0.83 when the emitter current was changed to 170 microamps. Thus, the diode equation approximation (Equation 2) regarding the ratios of collector and emitter currents for a transistor can cause relatively inaccurate temperature measurements in an integrated circuit based on smaller process geometries. Relatively significant inaccurate temperature measurements can occur in integrated circuits that have process geometries of 90 nanometers or less.

The invention provides for a more accurate temperature measurement for a transistor with a rewritten form of the diode equation (Equation 3) that provides for actually measuring or controlling the ratio of collector currents instead of the ratio of emitter currents.

$$T = \Delta Vbe \Big/ \left(\eta \frac{\kappa}{q} \ln\left(\frac{Ic1}{Ic2}\right)\right) \qquad \text{Equation 3}$$

Figure 1:
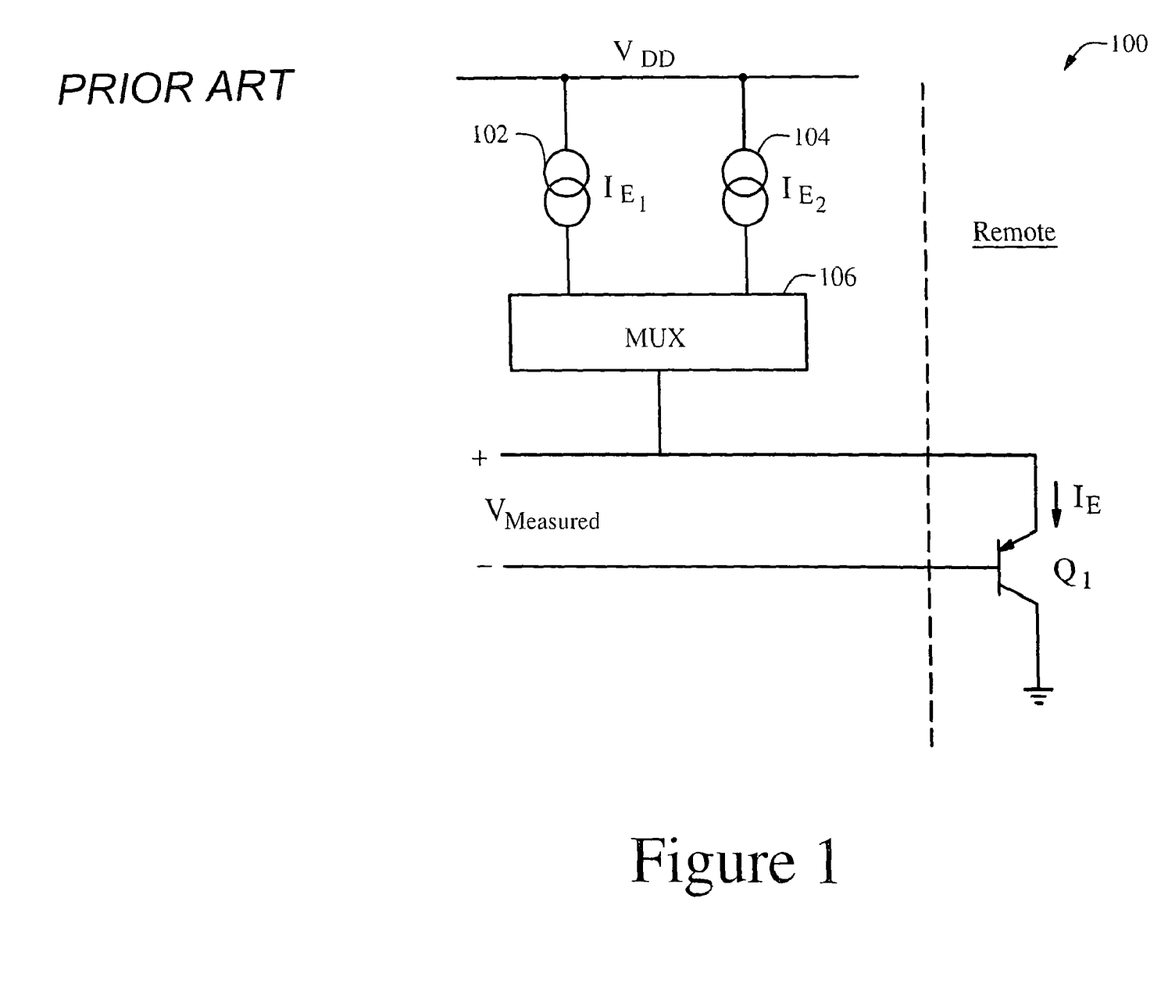
FIG. 1 illustrates a schematic diagram of an exemplary circuit that provides two known emitter currents for a remotely located transistor.

FIG. 1 illustrates a schematic diagram of overview 100 for an exemplary circuit that provides two known emitter currents for a remotely located p-n-p transistor (Q1). Current sources 102 and 104 are separately coupled between a voltage source (Vdd) and multiplexer 106. As each current source is selected, it provides a known emitter current to the remotely located transistor Q1. The provided emitter currents induce base-emitter voltages across the transistor that can be measured (Vmeasured) and employed to determine the temperature based on an approximation of the diode equation (Equation 2).

Figure 2:
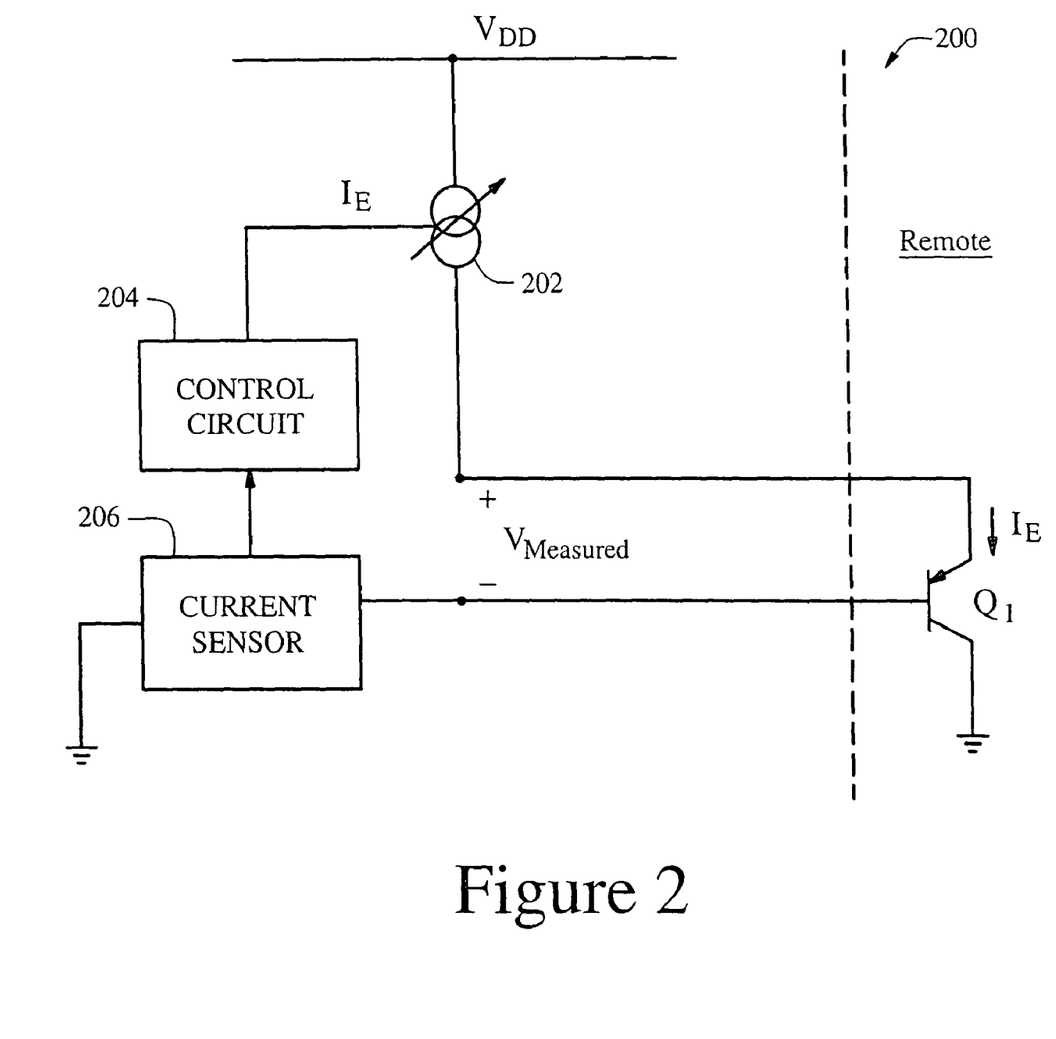
FIG. 2 shows a schematic diagram of an exemplary circuit for determining collector currents for a remotely located transistor.

FIG. 2 shows a schematic diagram of general overview 200 of components for determining collector currents for a remotely located transistor Q1. Current sensor 206 is coupled to the base of transistor Q1 where it is employed to measure the base current of this transistor. Current sensor 206 provides the measured base current to control circuit 204 which in turn controls the operation of variable current source 202. For two separate ranges of emitter current, the variable current source is varied so that the determination of the collector current (Icurrent=Iemitter−Ibase) is equivalent to a first target (predetermined) collector current and a second target collector current. The base-emitter voltage (Vmeasured) for the remotely located transistor Q1 is measured when the determined collector current is equivalent to one of the target collector currents. The arrangement of these components enable the temperature for a remotely located transistor to be determined based on an actual ratio of predetermined target collector currents, not an approximation. Additionally, substantially the same arrangement of these components could be employed to determine the temperature of a transistor that was disposed locally, i.e., the transistor can be disposed in the same integrated circuit as the components employed to measure its currents.

Figure 3A:
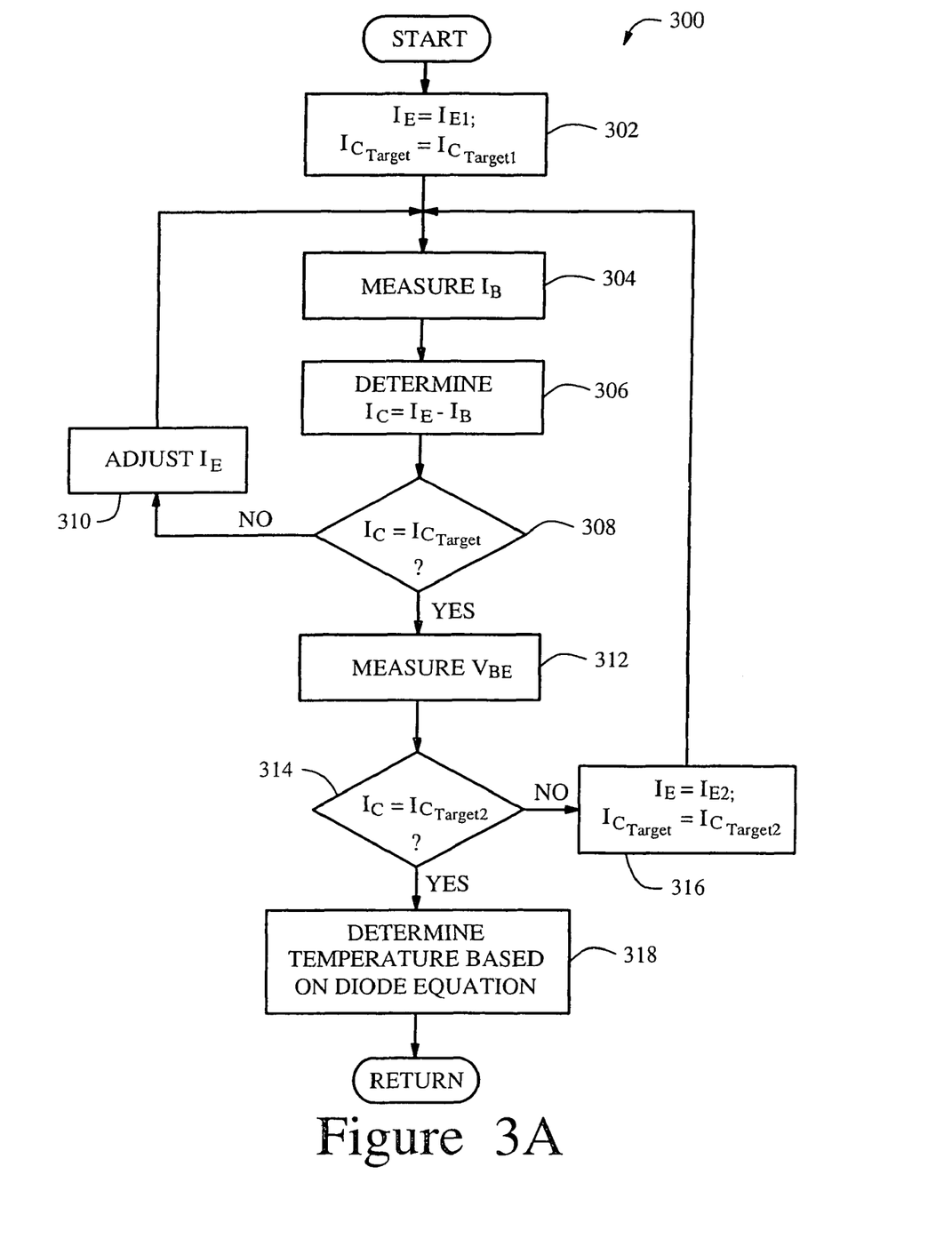
FIG. 3A illustrates a flow chart for determining the temperature of a remotely located transistor based on separate measurements of its base-emitter voltage for two determined target collector currents.

FIG. 3A illustrates a flow chart for determining the temperature of a remotely located transistor based on separate measurements of its base-emitter voltage for two iteratively determined target collector currents. Moving from a start block, the process steps to block 302 where the emitter current provided to the remotely located transistor is adjusted to a first value. Also, a first target value is provided for comparing to a determined collector current. At block 304, the base current for the remotely located transistor is measured. Flowing to block 306, the collector current is determined by the difference between the first value of the emitter current and the measured base current, i.e., Ic=Ie'−Ib. Advancing to decision block 308, a determination is made as to whether or not the determined collector current is, equivalent to the first target value. If false, the process moves to block 310 where the emitter current is adjusted. Next, the process returns to block 304 and performs substantially the same actions discussed above. This process substantially loops until the determined collector current is relatively equivalent to the first target value.

If the determination at decision block 308 had been true, the process would have stepped to block 312 where the base-emitter voltage of the remotely located transistor for the first target value would be measured and stored. Moving to decision block 314, another determination is made as to whether or not the value of the determined collector current is equivalent to a second target value. If false, the process steps to block 316 where the second target value is provided for comparing to the determined collector current. The process returns to block 304 and performs substantially the same actions discussed above except for the second target value.

Once the determination at decision block 314 is true, the process moves to block 318 where the diode equation (discussed above) is employed to determine the temperature of the remotely located transistor based on the measured base-emitter voltages for two predetermined (target) values for the collector currents. Next, the process returns to performing other actions.

The determined temperature may be converted into a representation of the temperature that may be displayed or employed by other devices to control the temperature of the integrated circuit that includes the remotely located transistor. Additionally, substantially the same process can be employed to determine the temperature of a transistor that is disposed locally, i.e., in the same integrated circuit as the components employed to measure the transistor's currents.

Figure 3B:
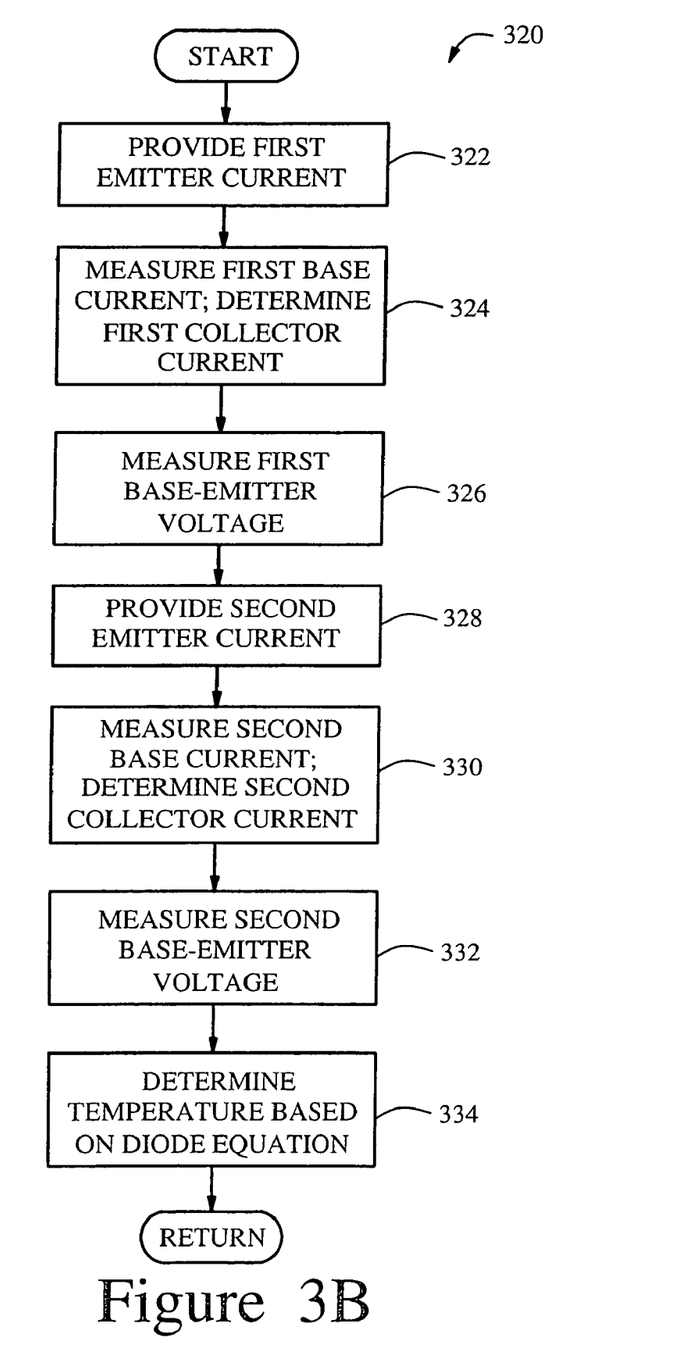
FIG. 3B illustrates a flow chart for determining the temperature of a remotely located transistor based on separate measurements of its base-emitter voltage for two determined collector currents.

FIG. 3B illustrates a flow chart for determining the temperature of a remotely located transistor based on separate measurements of its base-emitter voltage for two determined collector currents. Moving from a start block, the process steps to block 322 where a first emitter current that has a known value, e.g., "X" milliamps, is provided to the remotely located transistor. At block 324, a first base current is measured. Also, the known first emitter current and the measured first base current are employed to determine a first collector current, i.e., the collector current is equivalent to the emitter current minus the base current. Moving to block 326, the process measures a first base-emitter voltage for the transistor.

Next, the process advances to block 328 where a second emitter current that has a known value, e.g., "Y" milliamps, is provided to the remotely located transistor. At block 330, a second base current is measured. Also, the known second emitter current and the measured first base current are employed to determine a second collector current. Stepping to block 332, the process measures a second base-emitter voltage for the transistor. Flowing to block 334, the process employs the diode equation to determine the temperature of the transistor which is based in part on a ratio of the determined first and second collector currents and the difference between the first and second measured base-emitter voltage. Next, the process returns to performing other actions.

The determined temperature may be converted into a representation of the temperature that may be displayed or employed by other devices to control the temperature of the integrated circuit that includes the remotely located transistor. Additionally, substantially the same process can be employed to determine the temperature of a transistor that is disposed locally, i.e., in the same integrated circuit as the components employed to measure the transistor's currents.

Figure 4A:
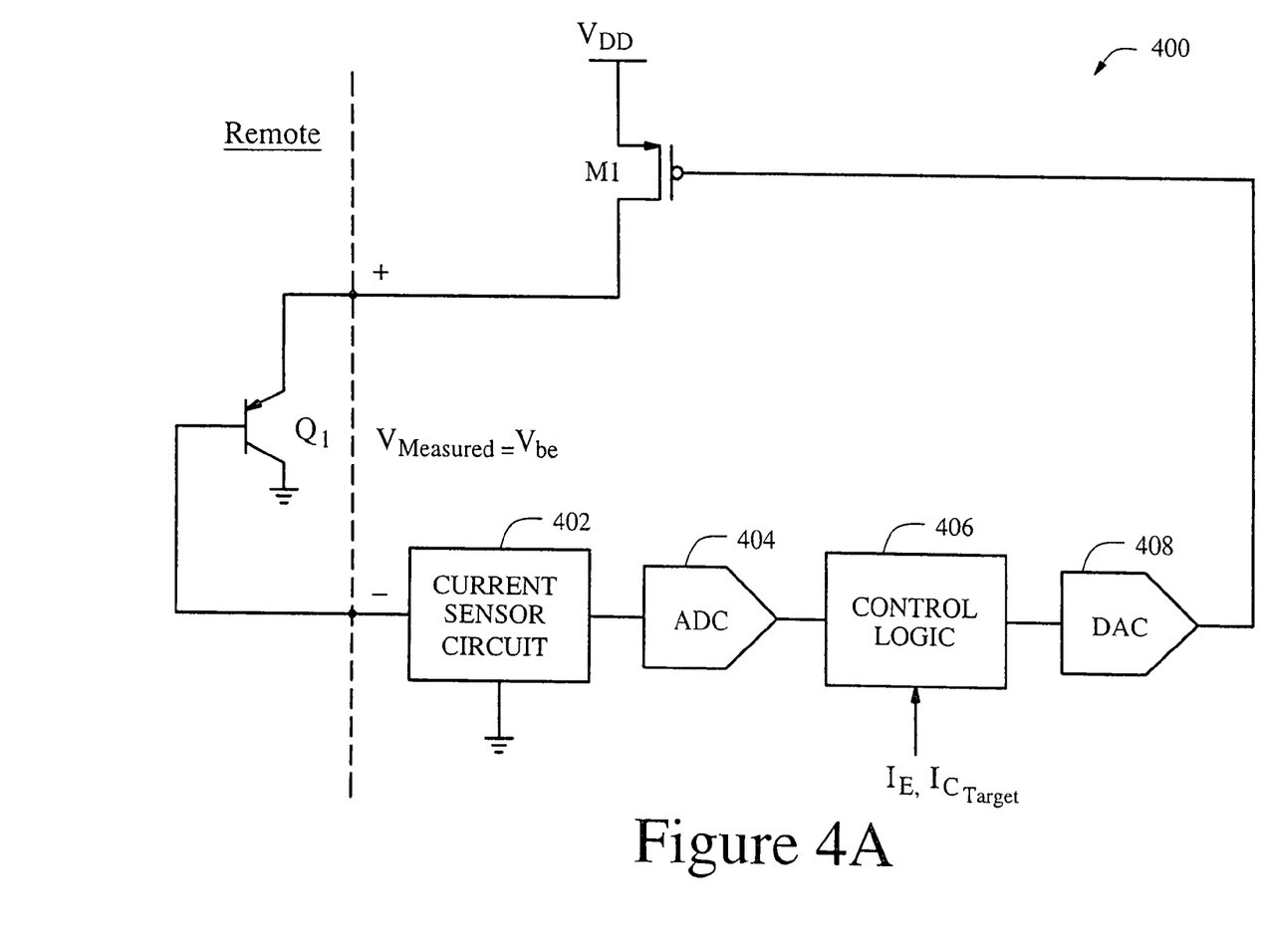
FIG. 4A illustrates a schematic diagram of an exemplary circuit that employs digital components to determine target collector currents for a remotely located transistor.

FIG. 4A illustrates a schematic diagram of overview 400 for employing digital components to determine collector currents for a remotely located transistor Q1 in accordance with the process discussed above for FIG. 3A. Current sensor circuit 402 measures the base current for transistor Q1 and converts the measured current into an analog voltage signal. This voltage signal is provided to analog-to-digital converter (ADC) 404 where the analog signal is converted into the digital domain. ADC 404 provides this digitalized signal to control logic 406. Also, control logic 406 receives a value of the emitter current presently provided to transistor Q1 and a target value (first or second) for the determined collector current.

Control logic 406 is coupled to digital-to-analog converter (DAC) 408 and provides a digital signal to the DAC to increase, decrease, or remain constant in regard to the emitter current for transistor Q1. The analog output signal from DAC 408 is coupled to the gate of MOSFET M1 which in turn provides the emitter current to transistor Q1. Changes in the analog signal output of DAC 408 causes MOSFET M1 to either increase or decrease the emitter current provided to transistor Q1. Additionally, substantially the same arrangement of these components in FIG. 4A could be employed to determine the temperature of a transistor that is disposed locally, i.e., the transistor can be disposed in the same integrated circuit as the components employed to measure its currents.

Figure 4B:
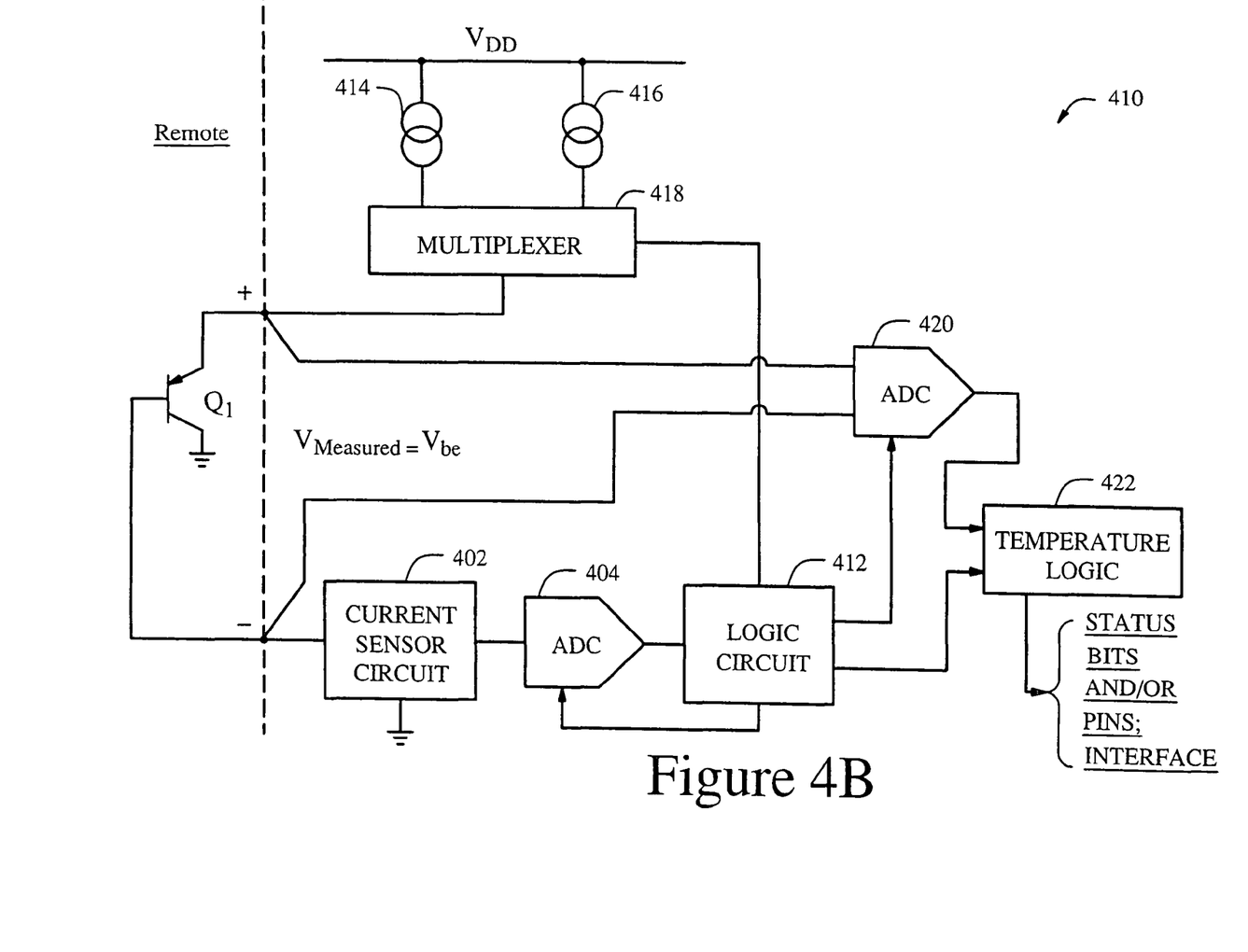
FIG. 4B shows a schematic diagram of an exemplary circuit that employs digital components to determine collector currents for a remotely located transistor.

FIG. 4B illustrates a schematic diagram of overview 410 for employing digital components to determine collector currents for a remotely located transistor Q1 in accordance with a process discussed above for FIG. 3B. Current sensor circuit 402 measures the base current for transistor Q1 and converts the measured current into an analog voltage signal. This voltage signal is provided to analog-to-digital converter (ADC) 404 where the analog signal is converted into the digital domain. ADC 404 provides this digitalized signal to logic circuit 412. An output of logic circuit 412 is coupled back to ADC 404 to save power by de-energizing the ADC if it is not actively employed to measure the base current. Known emitter currents are separately provide to transistor Q1 by current sources 414 and 416 through multiplexer 418. An analog-to-digital converter (ADC) 420 is coupled across the base and emitter of the remotely located transistor Q1 for measuring the transistor's base-emitter voltage. Another output of logic circuit 412 is coupled to ADC 420 to save power by de-energizing this ADC if it is not actively employed to measure the base-emitter voltage current. The output of ADC 420 and another output of logic circuit 412 are coupled to temperature logic 422 to determine the temperature of transistor Q1 and provide a representation of the determined temperature with status bit(s), pin(s) serial interface(s), parallel interface(s) bus(es), and the like.

In one embodiment, the resolution for ADC 404 to measure the base current might be configured to be substantially less than the resolution of ADC 420 to measure the base-emitter voltage of transistor Q1. Also, since the first and second determined collector currents are employed to determine temperature, gain correction is automatically provided for measuring the base-emitter voltage of the transistor Q1, i.e., increase, decrease, or remain constant based on the determined collector current of the transistor. Also, in yet another embodiment, a variable current source could be employed to perform substantially the same actions as current sources 414 and 416 and multiplexer 418.

Additionally, substantially the same arrangement of these components in FIG. 4B could be employed to determine the temperature of a transistor that is disposed locally, i.e., the transistor can be disposed in the same integrated circuit as the components employed to measure its currents.

Figure 5:
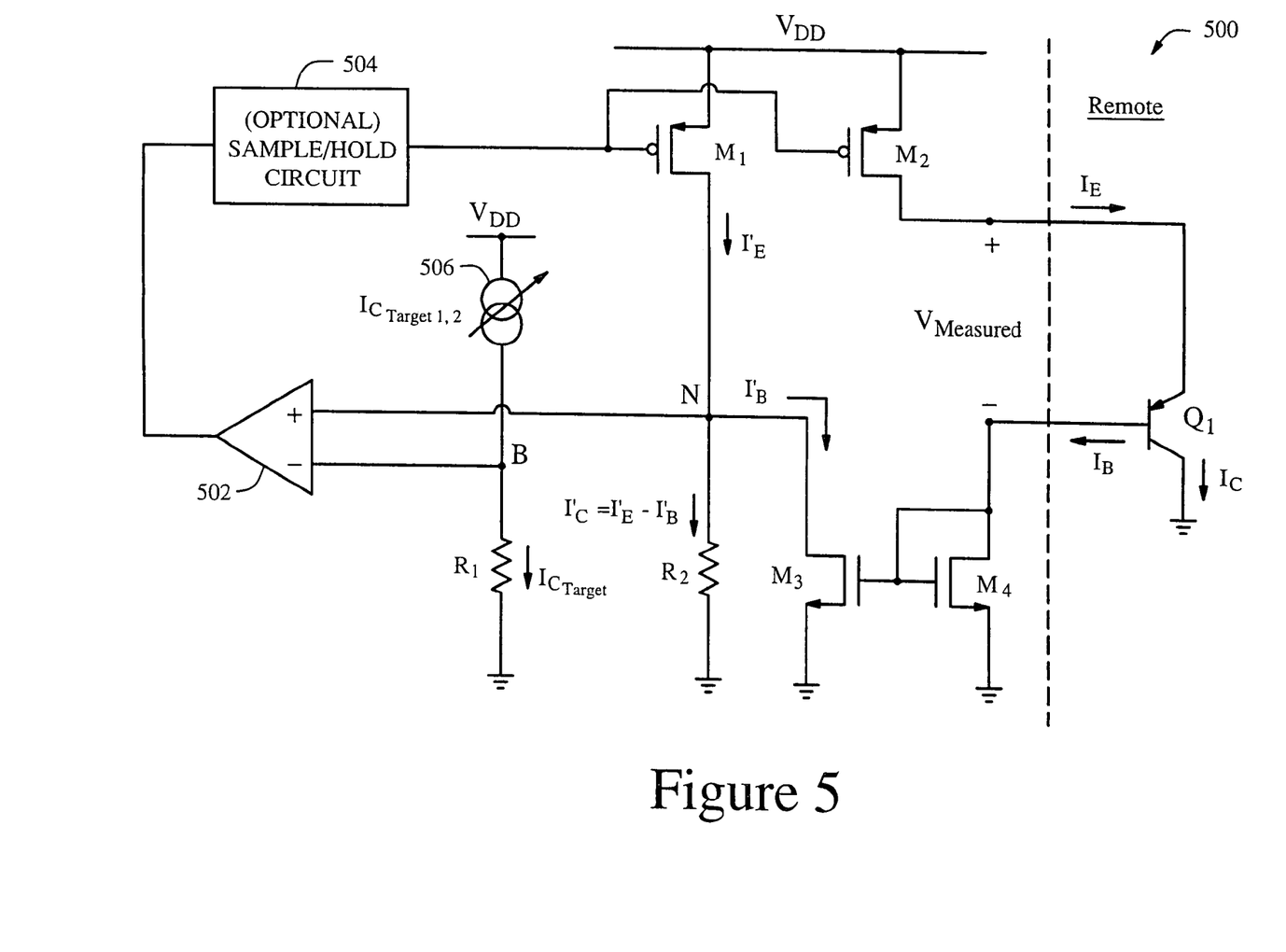
FIG. 5 illustrates a schematic diagram of an exemplary circuit that employs analog components to determine collector currents for a remotely located transistor.

FIG. 5 illustrates a schematic diagram of overview 500 for employing analog components to determine collector currents for a remotely located transistor Q1 in accordance with the process discussed above. A pair of substantially matched MOSFET transistors M1 and M2 have their sources coupled to a voltage supply (Vdd) and their gates coupled to an output of opamp 502. The drain of MOSFET M2 is coupled to the emitter of remotely located transistor Q1 and arranged to provide an emitter current (Ie). The drain of MOSFET M1 is similarly arranged to provide a relatively equivalent current (Ie') to a node "N", i.e., Ie'=Ie.

Node N is coupled to the non-inverting input of opamp 502, an end of resistor R2 (other end of resistor R2 is coupled to ground) and the drain of MOSFET M3. MOSFETs M4 and M3 are substantially matched to each other and configured in a current mirror arrangement where their sources are coupled to ground and their gates are coupled together. Further, the gate of MOSFET M4 is coupled to its drain and the base of remotely located transistor Q1 so that the base current Ib of transistor Q1 is mirrored by another current flowing through MOSFET M3, i.e., Ib=Ib'. Since the non-inverting input to opamp 502 has a relatively infinite impedance at Node N, the current (Ic') that flows through transistor R2 is equivalent to Ie'–Ib', which in turn is relatively equivalent to the collector current. One terminal of variable current source 506 is coupled to the voltage supply (Vdd) and another terminal of the variable current source is coupled at Node "B" to both an end of resistor R1 and the inverting input to opamp 502. The other end of resistor R1 is coupled to ground; and the impedance values of resistors R1 and R2 are relatively equivalent to each other. However, in another embodiment, the impedances of resistors R1 and R2 can be significantly different values so long as a ratio of their impedances is known, e.g., the impedance of R1 could be equivalent to several multiples of the impedance of R2, and vice versa.

Since the inverting input to opamp 502 has a relatively infinite impedance, a target collector current (Ictarget) provided by the variable current source flows primarily through resistor R1 to ground. Based on the difference in voltage drops at its non-inverting and inverting inputs caused by the flow of Ictarget through resistor R1 and the flow of Ic' through resistor R2, opamp 502 adjusts its output to drive the gates of MOSFETs M1 and M2 until these voltage drops are relatively equivalent, such that Ic'=Ictarget. Once Ic' is relatively equivalent to Ictarget, the base-emitter voltage (Vmeasured) for transistor Q1 is measured for a first target collector current. This process is repeated for a second target collector current and a second measurement of the base-emitter voltage for transistor Q1 is performed. Additionally, once Ic' is adjusted to be relatively equivalent to a target collector current (Ictarget), optional sample and hold circuit 504 enables the base-emitter voltage of transistor Q1 to be measured while at least opamp 502 is de-energized to conserve power and reduce noise. Furthermore, the diode equation can be employed to determine the temperature of transistor Q1 based on the two measurements of the base-emitter voltage for this transistor and a ratio of the two target collector currents (Ictarget1 and Ictarget2). Additionally, substantially the same arrangement of these components could be employed to determine the temperature of a transistor that is disposed locally, i.e., the transistor can be disposed in the same integrated circuit as the components employed to measure its currents.

Figure 6:
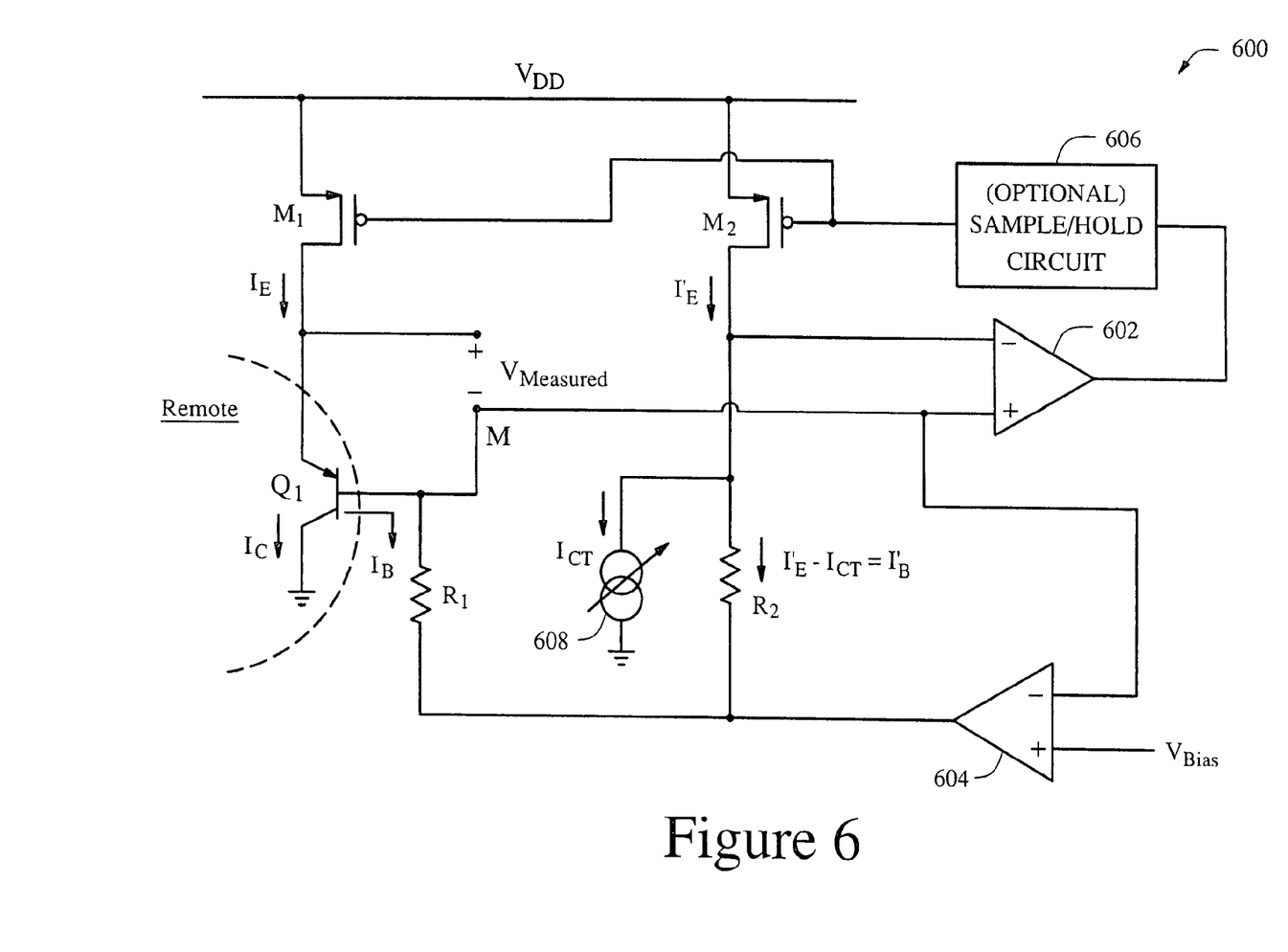
FIG. 6 illustrates a schematic diagram of an exemplary circuit that employs analog components to determine collector currents for a biased and remotely located transistor.

FIG. 6 illustrates a schematic diagram of overview 600 for employing analog components to determine collector currents for a biased and remotely located transistor Q1 in accordance with the process discussed above. The operation of this embodiment is similar in some ways to the embodiment discussed in FIG. 5, albeit different in other ways such as biasing. The sources of a pair of substantially matched MOSFET transistors M1 and M2 are coupled to a voltage supply (Vdd) and both of their gates are coupled to an output of opamp 602. The drain of MOSFET M1 is coupled to the emitter of remotely located transistor Q1 and arranged to provide an emitter current (Ie) to this transistor. The drain of MOSFET M2 is similarly arranged to provide a relatively equivalent current (Ie'=Ie) at one end of resistor R2 and the inverting input of opamp 602. This particular end of resistor R2 is also coupled to one terminal of variable current source 608 whose other terminal is coupled to ground. Also, the other end of resistor R2 is coupled to the output of bias opamp 604.

At Node M, the base of transistor Q1 is coupled to one end of resistor R1 whose other end is coupled to the output of bias opamp 604. Also, the base of transistor Q1 is coupled to the non-inverting input of opamp 602 and the inverting input of bias opamp 604. The impedance values for resistors R1 and R2 are substantially equivalent to each other. Also, a bias voltage Vbias is coupled to the non-inverting input of bias opamp 604.

In operation, Vbias is applied to the non-inverting input of bias opamp 604 to bias the operation of the listed components above the common mode voltage and MOSFET M1 provides the emitter current (Ie) to the remotely located transistor Q1 so that a base current (Ib) flows through resistor R1. A similar current (Ie') is provided by MOSFET M2 to the other components in the circuit such that variable current source 608 sinks a target collector current (Ictarget) and the current (Ib') flowing through resistor R2 is substantially equivalent to Ie'–Ictarget. The output of opamp 602 is adjusted until the base current (Ib) flowing through resistor R1 is relatively equivalent to the current (Ib') flowing through resistor R2 for the target collector current (Ictarget).

Additionally, the operation of bias opamp 604 ensures that the voltage at Node M (base of transistor Q1) is relatively equivalent to a predetermined bias voltage Vbias. Also, the operation of opamp 602 ensures that the collector current for the remotely located transistor Q1 is adjusted to the value of the target collector current.

Once Ib' is relatively equivalent to Ib, the base-emitter voltage (Vmeasured) for transistor Q1 is measured for a first target collector current. This process is repeated for a second target collector current and a second measurement of the base-emitter voltage for transistor Q1 is performed. Additionally, once Ib' is adjusted to be relatively equivalent to Ib for a given target collector current (Ictarget), optional sample and hold circuit 606 enables the base-emitter voltage of transistor Q1 to be measured while at least opamp 602 is de-energized to conserve power and to reduce noise. Furthermore, the diode equation can be employed to determine the temperature of transistor Q1 based on the two measurements of the base-emitter voltage for this transistor and a ratio of the two target collector currents (Ictarget 1 and Ictarget2). Additionally, substantially the same arrangement of these components could be employed to determine the temperature of a transistor that is disposed locally, i.e., the transistor can be disposed in the same integrated circuit as the components employed to measure its currents.

Figure 7:
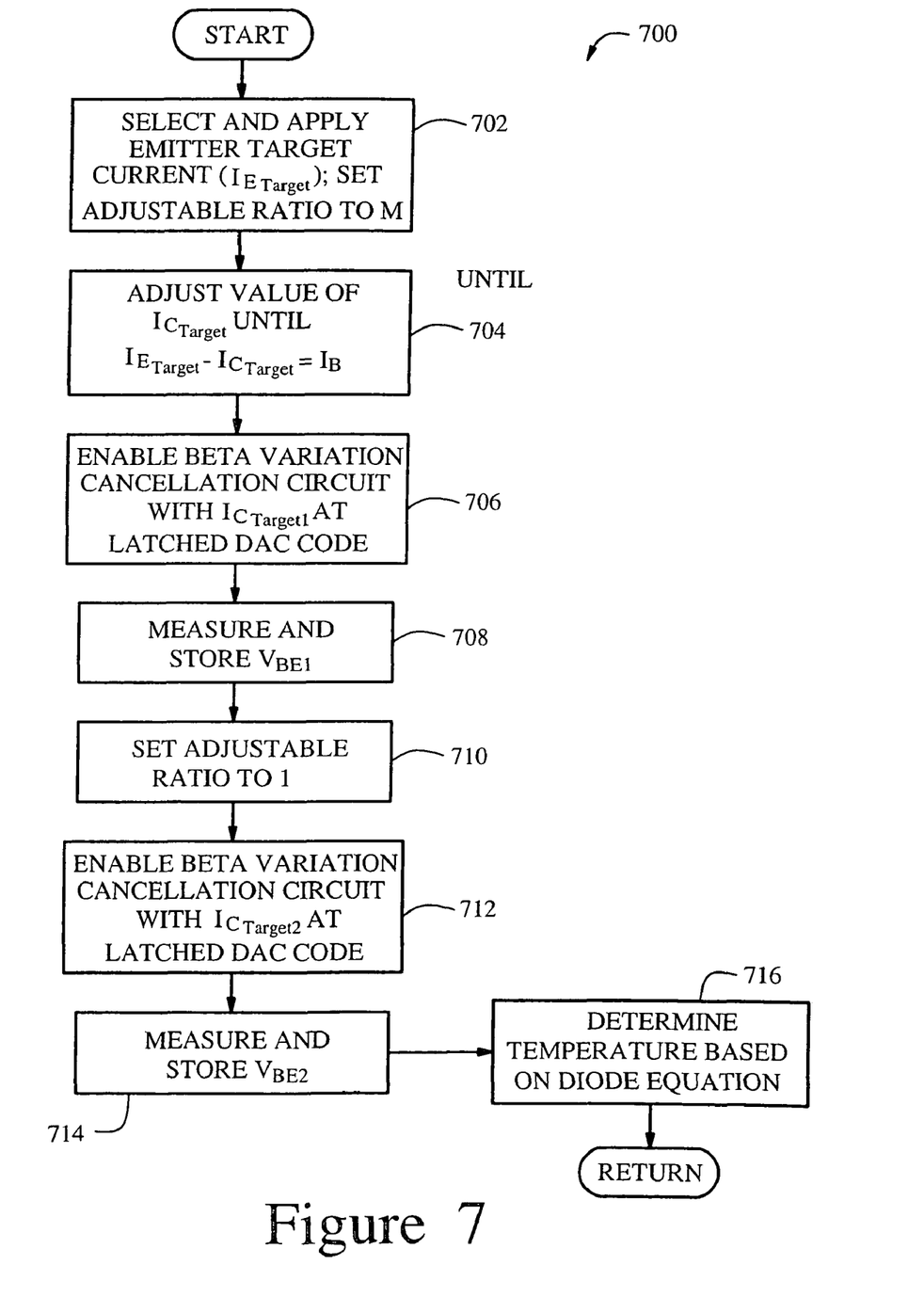
FIG. 7 illustrates a flow chart for determining two target collector currents that can be employed in the determination of the temperature for a remotely located transistor.

FIG. 7 illustrates a flow chart for determining two target collector currents that can be employed in the determination of the temperature for a remotely located transistor. Moving from a start block, the process steps to block 702 where a target emitter current is selected and applied to the remotely located transistor and other components employed to measure at least one of this transistor's collector and base currents. Also, an adjustable ratio of one MOSFET transistor in a current mirror that provides a target collector current is set equal to M where M is equivalent to a ratio of a first target collector current over a second target collector current. In one embodiment, M is set equal to 16.

At block 704, the process adjusts the value of the target collector current until the target emitter current minus the target collector current is equivalent to the base current of the remotely located transistor. Also, the code for a Digital to Analog Converter (DAC) that enables the adjustment of the target collector current is set equal to zero; and the DAC code is incremented until a comparator changes state and indicates that the base current of the remotely located transistor is equivalent to the target emitter current minus the target collector current. This incremented DAC code is latched at the state change of the comparator.

Moving to block 706, the process enables an exemplary beta variation cancellation circuit with a first target collector current that is equivalent to the Ictarget at the latched DAC code. Exemplary beta variation cancellation circuits and their operation are taught in FIGS. 2, 4-6, and 8-9 and the related discussion. At block 708, the base-emitter voltage Vbe1 for the first target collector current (Ictarget1) is measured and stored.

Advancing to block 710, the process changes the adjustable ratio from M to one for the one MOSFET transistor in the current mirror that provides the target collector current so that the second target collector current is substantially smaller than the first target collector current. At block 712, the process enables an exemplary beta variation cancellation circuit with a second target collector current that is equivalent to the Ictarget at the second latched DAC code. At block 714, the base-emitter voltage Vbe2 for the second target collector current (Ictarget2) is measured and stored. Next, the process steps to block 716 where the diode equation is employed to determine the temperature of the remotely located transistor. The process subsequently returns to performing other actions. Additionally, substantially this same process could be employed to determine the temperature of a transistor that is disposed locally, i.e., the transistor can be disposed in the same integrated circuit as the components employed to measure its currents.

Figure 8:
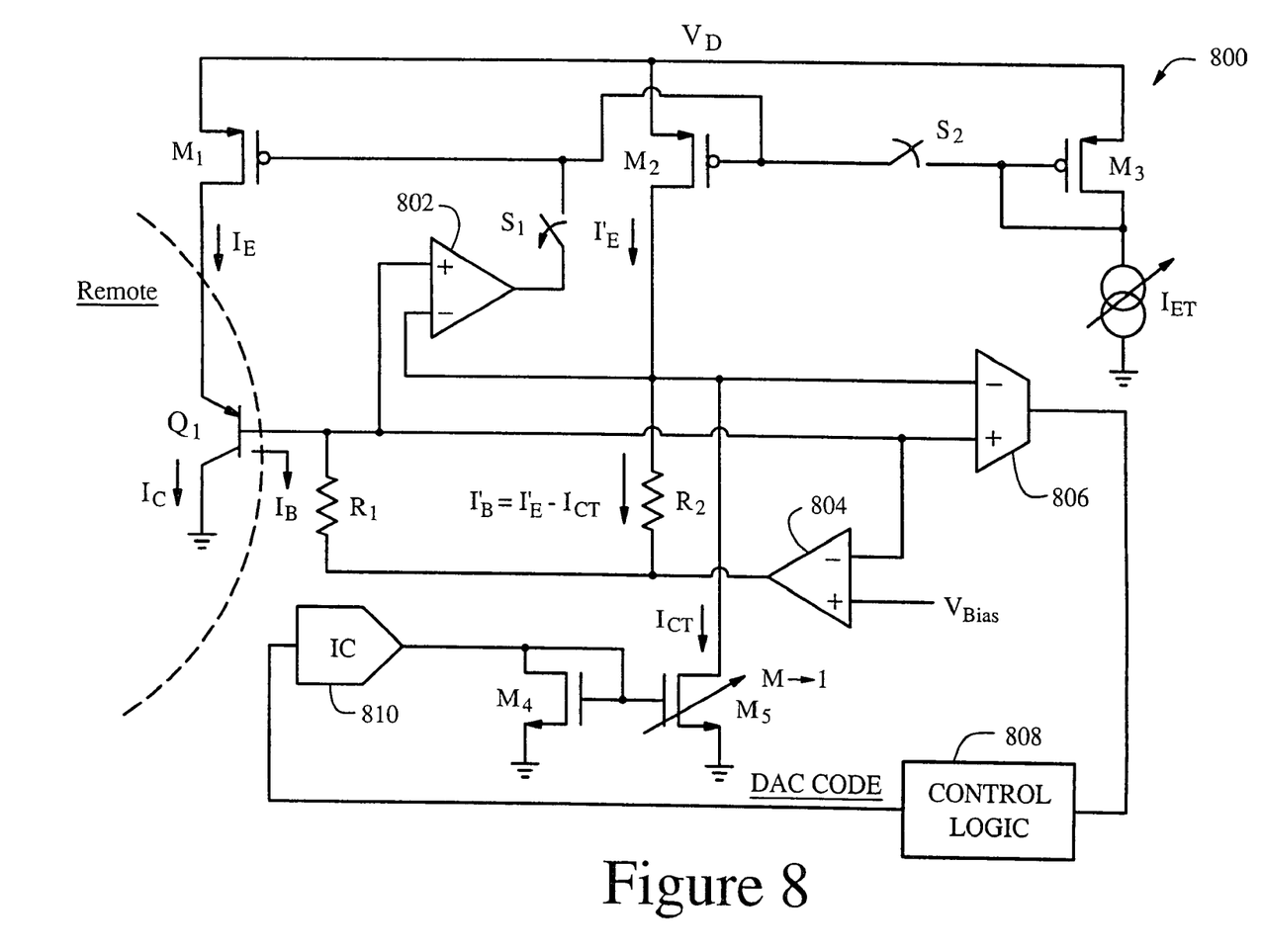
FIG. 8 shows a schematic diagram of an exemplary circuit for determining a first and a second target collector current for the process described for FIG. 7.

FIG. 8 shows a schematic diagram of overview 800 for determining a first and a second target collector current in a manner substantially similar to the process described for FIG. 7. Also, the arrangement and operation of the electronic circuit shown in FIG. 8 is substantially similar to the electronic circuit shown in FIG. 6, albeit different in some ways. In particular, FIG. 8 teaches enabling the first and second target collector currents to be determined based on a selected target emitter current and an adjustable ratio for a variable current mirror prior to measuring the base-emitter voltage for the remotely located transistor. The variable current mirror provides the target collector currents and is formed by the arrangement of MOSFET transistors M4 and M5 where the impedance of M5 is adjustable.

Additionally, the inputs to comparator 806 are coupled to the inverting inputs of bias opamp 804 and opamp 802. The output of the comparator is coupled to control logic 808 which outputs a code for DAC 810. The output of the DAC is coupled to the gates of the MOSFETs M4 and M5. Also, MOSFET M3 is configured to provide a target emitter current and operate as another current mirror with MOSFET transistors M1 and M2. This other current mirror ensures that the target emitter current (Ietarget) flowing through MOSFET M3 is substantially equivalent to the currents flowing through MOSFETS M1 (Ie) and M2 (Ie').

During the determination of the first and second target collector currents, the output of opamp 802 may be disconnected from the gates of MOSFETs M1 and M2 by the opening of analog switch S1. Also during this determination, MOSFET M3 is connected to the gates of MOSFETs M2 and M1 by the closing of analog switch S2. After the first and second target collector currents are determined, S1 closes and connects the output of opamp 802 to the gates of MOSFETs M1 and M2; and S2 opens and disconnects MOSFET M3 from the gates of MOSFETs M1 and M2.

Although not shown, a sample and hold circuit could also be provided that disconnects the output of opamp 802 from the circuit during the determination of target collector currents and the measurement of the base-emitter voltage for the remotely located transistor. Additionally, substantially the same arrangement of these components could be employed to determine the temperature of a transistor that is disposed locally, i.e., the transistor can be disposed in the same integrated circuit as the components employed to measure its currents.

Figure 9:
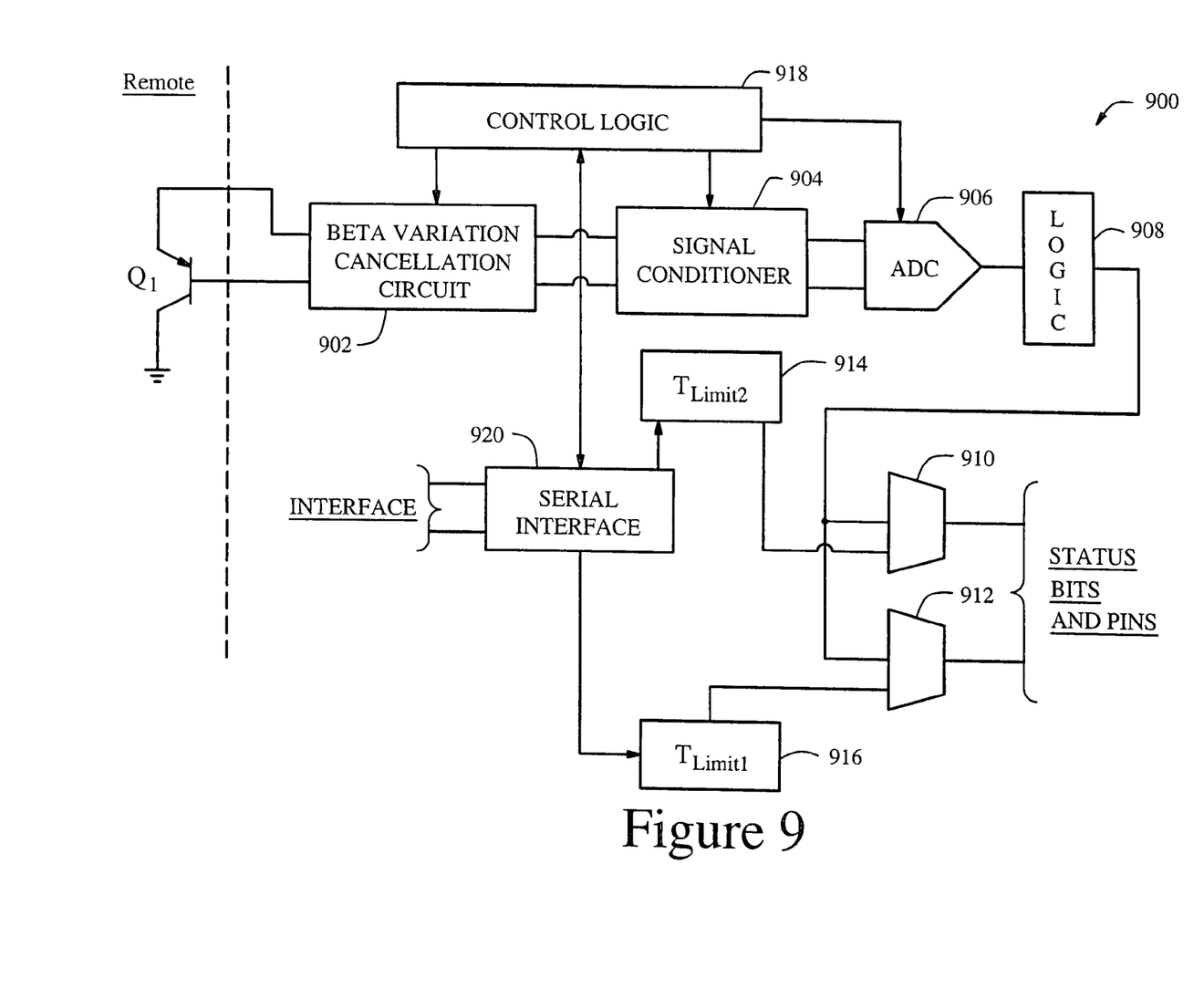
FIG. 9 illustrates an overview of a block diagram for components that measure the temperature of remotely located transistor in accordance with determined target collector currents and base-emitter voltages for the transistor.

FIG. 9 illustrates an overview of block diagram 900 for components to measure the temperature of remotely located transistor Q1 by determining target collector currents and base-emitter voltages for the transistor. In another integrated circuit, the remotely located transistor's base and emitter currents are coupled to beta variation cancellation circuit 902 (exemplary embodiments are discussed above). The analog signal output of circuit 902 is coupled to signal conditioner 904 which can include buffers, low pass filters, and the like, for damping/removing noise. The output of signal conditioner 904 is coupled to the inputs of analog to digital converter (DAC) 906 whose output is coupled to logic component 908.

The output of logic component 908 is coupled to one of the inputs for comparators 910 and 912. The output of these comparators can be provided as external status bits and/or pins for the integrated circuit. Another input to comparator 910 is coupled to an output of Temperature Limit2 (914). Also, the other input to comparator 912 is coupled to an output of Temperature Limit1 (916). Serial interface 920 is coupled to both of the temperature limits (914 and 916) and control logic 918. This control logic is also coupled to circuit 902, signal conditioner 904 and ADC 906.

Additionally, serial interface 920 is arranged so that an interface external to the integrated circuit can be employed to configure the operation of the control logic and the values of the two temperature limits (914 and 916). The serial interface can also be configured to provide a digitized value that represents a relatively accurate temperature of the remotely located transistor. Furthermore, substantially the same arrangement of these components could be employed to determine the temperature of a transistor that is disposed locally, i.e., the transistor can be disposed in the same integrated circuit as the components employed to measure its currents.

Figure 10:
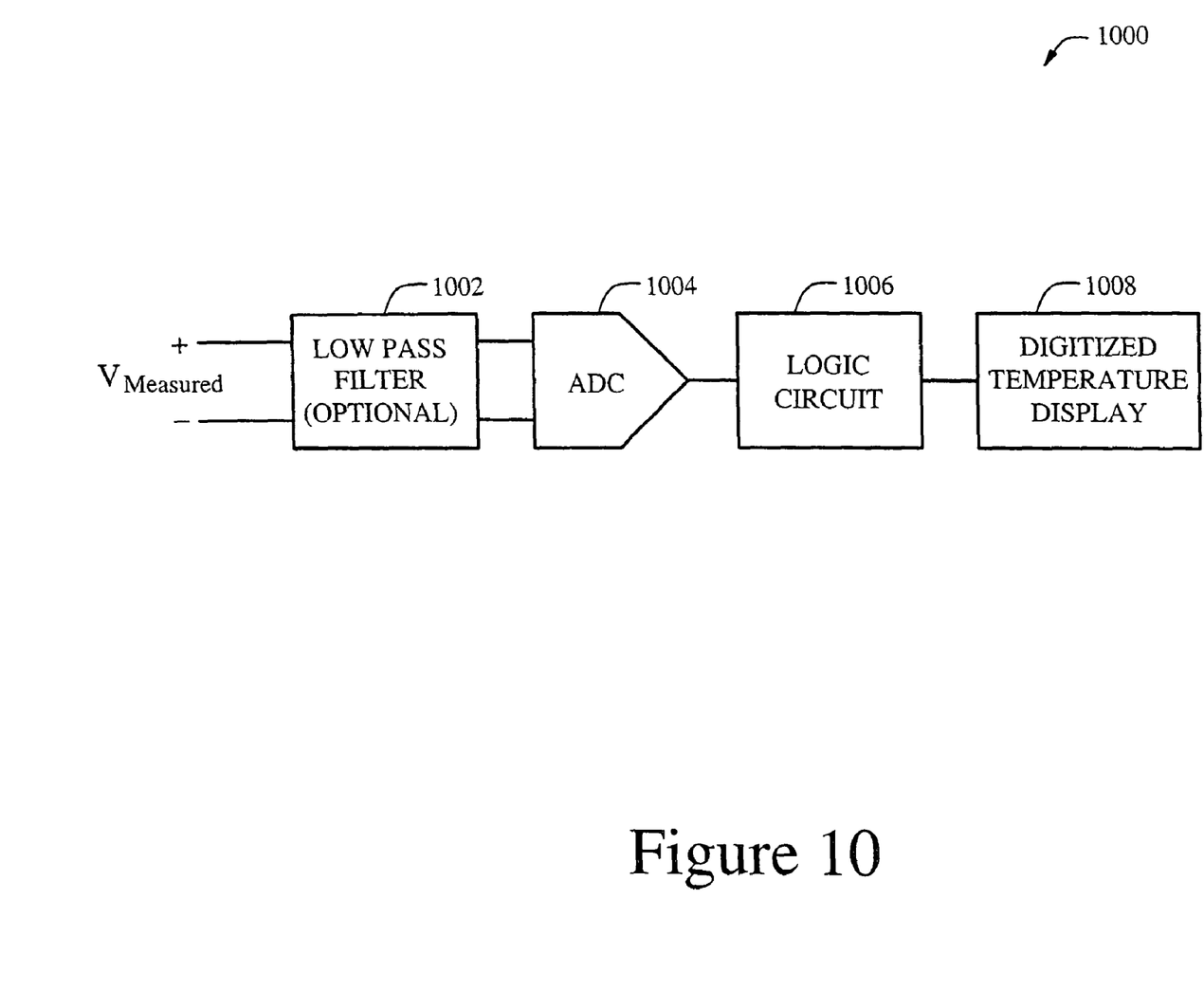
FIG. 10 illustrates a block diagram for an exemplary circuit for measuring the base-emitter voltage of a remotely located transistor in accordance with the invention.

FIG. 10 illustrates a block diagram of overview 1000 for an exemplary circuit for measuring the base-emitter voltage (Vmeasured) of a remotely located transistor. The Vmeasured is coupled to optional low pass filter 1002 which provides for reducing/eliminating noise in the measured voltage. The outputs of filter 1002 is coupled to the inputs of analog to digital converter (ADC) 1004 whose output is coupled to logic circuit 1006. The logic circuit converts the digitized measurement of the base-emitter voltage into a format that can be displayed by digitized temperature display 1008. Display 1008 can include numerical displays, colors, pictures, graphics, bar graphs, sounds, status bits, status pins, interfaces, and the like, as a representation of the digitized temperature for the remotely located transistor.

Additionally, in another embodiment, where the remotely located transistor is disposed in series with and/or accessed through one or more resistors, a resistive cancellation circuit may be provided in addition to the circuits discussed above. If these resistive cancellation circuits are used, likely more than two measurements of the base currents and/or base-emitter voltages may be performed to accurately determine the temperature of the resistor.

Moreover, it will be understood that each block of the flowchart illustrations discussed above, and combinations of blocks in the flowchart illustrations above, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor, provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A method for use in measuring a temperature of a bipolar measurement transistor, said method comprising:
   (a) providing a controller;
   (b) providing a first emitter current to an emitter terminal of the measurement transistor in response to the controller, with the first emitter current resulting in a first base current and a first collector current in the measurement transistor;
   (c) sensing the first base current at a base terminal of the measurement transistor;
   (d) sensing a base-emitter voltage of the measurement transistor when the measurement transistor is conducting the first emitter current;
   (e) providing a second emitter current to the measurement transistor emitter terminal in response to the controller, with the second emitter current resulting in a second base current and a second collector current in the measurement transistor and wherein the first and second emitter currents differ in magnitude;
   (f) sensing the second base current at the base terminal of the measurement transistor;
   (g) sensing a second base-emitter voltage of the measurement transistor when the measurement transistor is conducting the second emitter current;
   (h) establishing a magnitude ratio N of the first and second collector currents utilizing at least the sensed first and second base currents; and
   (i) determining the temperature of the measurement transistor based, at least in part, on the ratio N and a difference between the first and second base-emitter voltages.

2. The method of claim 1 wherein the step (h) includes determining a magnitude of the first collector current based upon a difference in magnitudes of the first emitter current and the first base current and further includes determining a magnitude of the second collector current based upon a difference in magnitudes of the second emitter current and the second base current.

3. The method of claim 2 further including providing a controllable current source configured to produce either the first or the second emitter currents in response to the controller and wherein
   the step (b) includes selecting the first emitter current of the controllable current source in response to the controller and
   the step (e) includes selecting the second emitter current of the controllable current source in response to the controller.

4. The method of claim 3 wherein the step (h) includes adjusting the first emitter current while sensing the first base current and includes adjusting the second emitter current while sensing the second base current to establish the magnitude ratio N.

5. The method of claim 4 wherein the step (h) includes forming a feedback path between emitter and base electrodes of the measurement transistor.

6. The method of claim 5 further including producing a first target signal and wherein the step (h) includes adjusting one of the first and second emitter currents so as to produce one of the first and second collector currents that matches the first target signal.

7. The method of claim 6 further including producing a second target signal and wherein the step (h) includes adjusting another one of the first and second emitter currents so as to produce another one of the first and second collector currents, with the first and second target signals having a magnitude ratio equal to the ratio N.

8. The method of claim 7 wherein the step of forming a feedback path includes comparing two comparison signals derived from a combination of signals including base current signals indicative of the measurement transistor base current and emitter current signals indicative of the measurement transistor emitter current and controlling the measurement transistor emitter current in response to the comparing.

9. The method of claim 8 wherein the comparing includes a first comparing and a second comparing and wherein the combination of signals further includes the first target signal used in the first comparing and wherein the combination of signals further includes the second target signal used in the second comparing.

10. The method of claim 9 wherein the two comparison signals include a first comparison signal derived from one of the first and second target signals and include a second comparison signal derived from the emitter current and base current signals.

11. The method of claim 10 wherein the second comparison signal is derived by subtracting the emitter and base current signals so that the second comparison signal is indicative of the measurement transistor collector current.

12. The method of claim 11 wherein the base current signals are generated using a current mirror circuit having a current mirror input connected to the base electrode of the measurement transistor.

13. The method of claim 9 wherein the two comparison signals include a first comparison signal and a second comparison signal and wherein the second comparison signal is derived from one of the first and second target signals, the emitter current signals and the base current signals.

14. The method of claim 13 wherein the first comparison signal is present at a first node and wherein the method further includes biasing the first node at a bias voltage which is substantially independent of the measurement transistor base current.

15. The method of claim 14 wherein the first node is coupled to the measurement transistor base electrode.

16. The method of claim 7 wherein the producing the first target signal includes establishing a first target signal having a magnitude which is dependent upon a current gain of the measurement transistor.

17. The method of claim 16 wherein the establishing a first target signal includes forming a feedback loop between the measurement transistor emitter and base electrodes.

18. The method of claim 17 wherein the establishing a first target signal includes storing an initial value dependent upon the current gain of the measurement transistor, with the first and second target signals being produced based upon the initial value.

19. The method of claim 18 wherein producing the first and second target signals includes multiplying the initial value by a factor of M1 to produce the first target signal and multiplying the initial value of a factor of M2 to produce the second target signal where the factors M1 and M2 have the ratio of N.

20. The method of claim 19 wherein the factor M1 is unity and the factor M2 is N.

* * * * *